United States Patent [19]
Wedler

[11] Patent Number: 4,802,189
[45] Date of Patent: Jan. 31, 1989

[54] METHOD AND CIRCUIT ARRANGEMENT FOR THE TRANSMISSION OF DATA SIGNALS BETWEEN SUBSCRIBER STATIONS OF A DATA NETWORK

[75] Inventor: Hartmut Wedler, Munich, Fed. Rep. of Germany

[73] Assignee: Siemens Aktiengesellshaft, Berlin and Munich, Fed. Rep. of Germany

[21] Appl. No.: 593,436

[22] Filed: Mar. 26, 1984

[30] Foreign Application Priority Data

Mar. 25, 1983 [DE] Fed. Rep. of Germany ....... 3311030

[51] Int. Cl.⁴ .......................................... H04L 27/00
[52] U.S. Cl. ...................................... 375/37; 370/84; 364/179
[58] Field of Search ......................... 375/37, 107, 109; 370/82, 83, 84, 99, 106; 364/179, 565; 179/2 DP

[56] References Cited

U.S. PATENT DOCUMENTS

| | | | |
|---|---|---|---|
| Re. 29,215 | 5/1977 | Carney et al. | 370/84 |
| 3,497,627 | 2/1970 | Blasbalg et al. | 370/84 |
| 3,536,840 | 10/1970 | Sullivan | 179/2 DP |
| 3,676,858 | 7/1972 | Finch et al. | 364/200 |
| 3,681,759 | 8/1972 | Hill, III | 370/84 |
| 3,982,074 | 9/1976 | Clark | 370/84 |
| 4,001,504 | 1/1977 | Hendrickson | 375/121 |
| 4,001,690 | 1/1977 | Mack et al. | 370/84 |
| 4,068,098 | 1/1978 | Tyselius | 370/84 |
| 4,258,433 | 3/1981 | Herschtal et al. | 179/2 DP |
| 4,460,993 | 7/1984 | Hampton et al. | 370/84 |

OTHER PUBLICATIONS

Lueder R., "Kommunikationsdienste und Teilnehmer. Technik im Dienstintegrierten Digitzlnetz" Telcom Report, V, 1980, vol. 3, No. 3, pp. 222-227.

Primary Examiner—Robert L. Griffin
Assistant Examiner—Stephen Chin
Attorney, Agent, or Firm—Hill, Van Santen, Steadman & Simpson

[57] ABSTRACT

For the transmission of data signals between subscriber stations of a data network to which subscriber stations designed for transmitting and receiving data signals having different signal rates, a calling subscriber station first outputs an information signal with which the data signal rate that is desired by or possible for the calling subscriber station is identified. In the called subscriber station, this information signal is compared to preset parameters existing there regarding the signal rate with which the subscriber station is capable of operating. In response to the comparison, that data signal rate which is the highest common data signal rate in view of the information signal and of the parameters is set in the cell subscriber station and is then set by an answer back signal in the calling subscriber station.

4 Claims, 1 Drawing Sheet

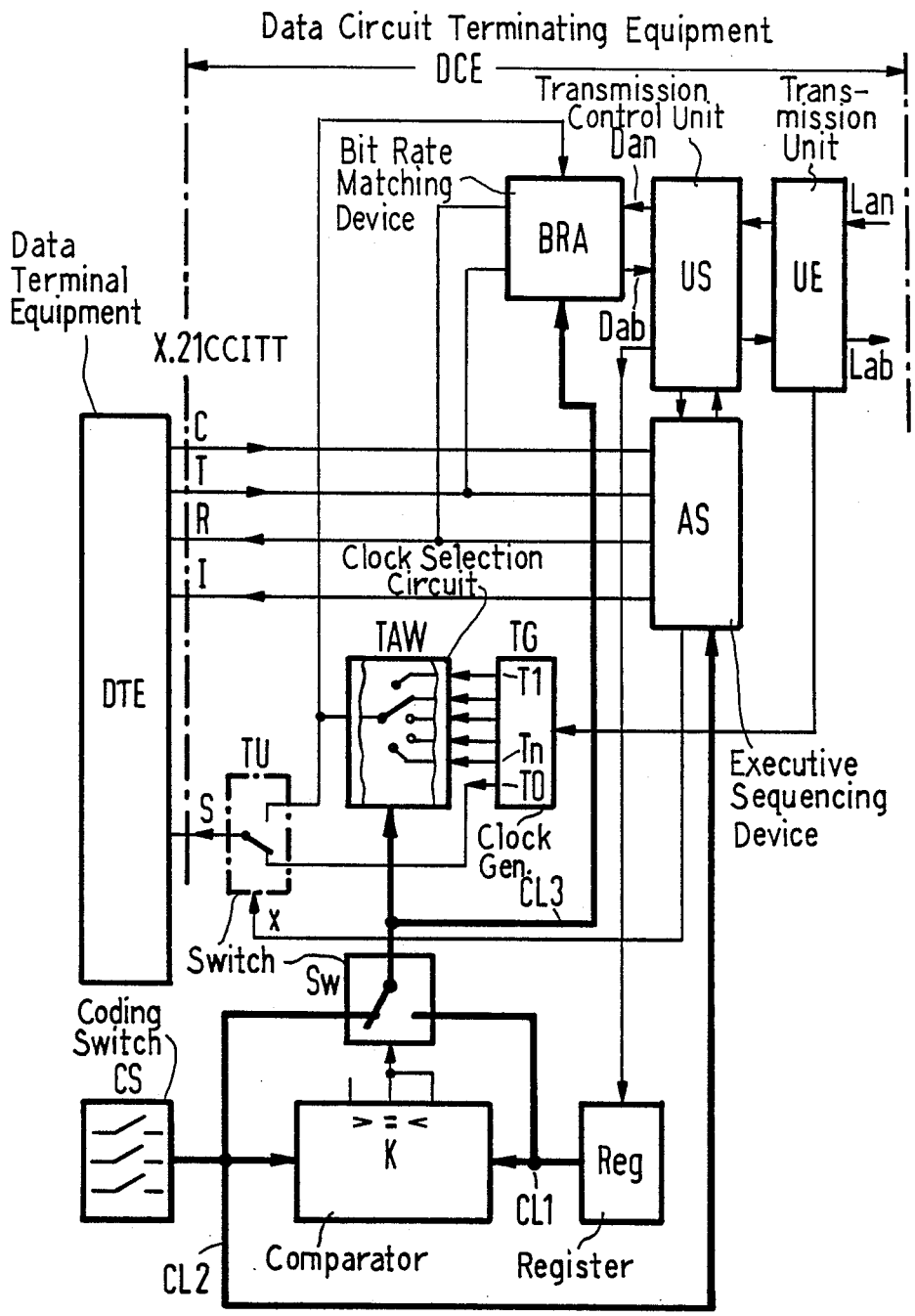

4,802,189

METHOD AND CIRCUIT ARRANGEMENT FOR THE TRANSMISSION OF DATA SIGNALS BETWEEN SUBSCRIBER STATIONS OF A DATA NETWORK

BACKGROUND OF THE INVENTION

1. Field of the Invention

The present invention relates to a method and to a circuit arrangement for the transmission of data signals between subscriber stations of a data network to which subscriber stations operating at different data rates are connected for the transmission and reception of data signals.

2. Description of the Prior Art

It is well known in the art, in the context of a planned, integrated services digital network (ISDN) to offer the subscriber stations of an exchange system different transmission capabilities in that a plurality of 64 kbit/s transmission channels are made available to the subscriber stations, as reported in the periodical Telcom Report, Vol. 3, No. 3, 1980, pp. 222–227, particularly Page 225. It is not known in this context, however, how connections are to be set up between such subscriber stations when the same involves different transmission capacities which are selectable for the respective connection.

SUMMARY OF THE INVENTION

The object of the present invention is to provide a method and circuit arrangement for setting up connections in a data network between subscriber stations that are equipped for different data signal rates or, respectively, are just incorporated in the connections.

Given a method of the type set forth above, the above object is achieved, according to the present invention, in that an information signal identifying the nominal data signal rate desired or possible proceeding from a calling subscriber station is output by the calling subscriber station in the course of the set up of a connection or thereafter. The appertaining information signal is compared call-by-call to preset parameters existing for the respective called subscriber station or, respectively, to be called regarding the data signal rates with which the called subscriber station or, respectively, subscriber station to be called is able to operate. As a result of the comparison of the information signal with the preset parameters, that data signal rate is set in the called or to be called subscriber station which, in view of the data signal rates given by the information signal, is the highest common signal rate which is possible for both subscriber stations to be connected to one another or, respectively, already connected to one another. The same data signal rate that has been set for the called or to be called subscriber station is set in the calling subscriber station by transmitting a setting signal thereto.

The present invention provides the advantage of achieving, in a particularly simple manner, that data signals can also be transmitted between such subscriber stations connected in the data network whose nominal data signal rates are different, but not higher than the transmission capacity of the connecting circuits. It is further advantageous that the setting of the data signal rate or, respectively, transmission rate governing the respective connection can automatically occur between the subscriber stations connected to one another or to be connected to one another without separate setting events needing to be executed in exchange-oriented or transmission-oriented devices.

Given an already existing setting of the respective data signal rate that is just maximally possible in the respective called subscriber station or, respectively, subscriber station to be called, and the appearance of an information signal which relates to a data signal rate that is at most equal to the first-mentioned data signal rate, only one setting signal for setting the first-mentioned data signal rate for the calling subscriber station is output. Deriving therewith is the advantage of a particularly low control expense for the required setting of the data signal rates to be used for the respective data signal transmission.

It is expedient for the implementation of the method according to the present invention to utilize a circuit arrangement that is characterized in that a data circuit terminating equipment DCE with which the respective terminal is connected to a transmission line is provided for each subscriber station, in that parameters regarding which nominal maximum data signal rate the appertaining subscriber station is designed for or, respectively, is now operational for are preset in the data circuit terminating equipment DCE of each subscriber station, in that a comparator within each data circuit terminating equipment DCE enables the parameters respectively preset to be compared to an information signal supplied from a calling subscriber station, the information signal identifying the data rate just requested by or just possible for the calling subscriber station for a connection, in that a setting device is connected to the comparator, that a data signal rate which is the highest-possible common data signal rate of the data signal rates identified by the information signal and by the preset parameters in the data circuit terminating equipment DCE is set by the setting device based on the measure of the output signal of the comparator in the appertaining subscriber station, and in that corresponding setting signals can be transmitted from the setting device of the data circuit terminating equipment DCE of the respective called subscriber or, respectively, subscriber to be called, these being transmitted to the data circuit terminating equipment DCE of the calling subscriber station. Deriving herewith is the advantage of a particularly low circuit-oriented expense in order to set the maximally-possible data signal rate or, respectively, the data signal rate to be employed in common for the respective subscriber stations participating in or to participate in a connection.

Each signaling unit advantageously comprises a clock selection circuit which allows clock signals according to the various data signal rates to be output and which can be set by the setting device for emitting clock signals corresponding to the data signal rate being considered. This produces the advantage that the correct clock signals can be offered for the data signal rates coming into consideration.

In its output position, the clock selection switch preferably outputs clock signals according to a declared or defined data signal rate. This measure advantageously opens up the possibility of employing the appertaining, declared or defined data signal rates for the transmission of signaling information that are to be transmitted in the course of setting up connections between subscriber stations and with which the information signals that appertain to the data signal rates respectively desired or, respectively, possible for the data signal transmission, can be transmitted.

It is further advantageous when the setting device of each signaling unit comprises a bit rate matching device which effects a match between the data signal rate set at the appertaining subscriber station and a higher data signal rate which governs on a transmission line connected to the subscriber station. A clock pulse controlled operation with fixed clock frequency can be achieved by way of this measure in the overall network.

BRIEF DESCRIPTION OF THE DRAWING

Other objects, features and advantages of the invention, its organization, construction and operation will be best understood from the following detailed description, taken in conjunction with the accompanying drawing, on which there is a single figure which is a block diagram illustration of an embodiment of apparatus of the invention and for carrying out the method of the invention.

DESCRIPTION OF THE PREFERRED EMBODIMENTS

A subscriber station having a data terminal equipment DTE is illustrated on the drawing, and may be a matter of a data terminal equipment connected via an interface according to CCITT recommendation X.21 and a series of circuit devices to a transmission line which includes a line Lan for transmitting signals in the incoming transmission direction and a line Lab for transmitting signals in the outgoing transmission direction. The circuit devices interposed between the transmission line and the data terminal equipment DEE together form a data circuit terminating equipment DCE which serves for the automatic setting of data signal rates in the present case, among other things.

Among other things, the data circuit terminating equipment DCE illustrated on the drawing comprises an executive sequencing device AS which is connected to the data terminal equipment DTE by way of a plurality of lines C, T, R and I. The line C is a control line over which some control signals required by the executive sequencing unit are supplied. The line T is a transmission line over which signaling information is supplied to the executive sequencing unit AS from the data terminal equipment DTE in the call setup phase. The line R is a receiving line over which signaling information can be supplied to the data terminal equipment DTE from the executive sequencing unit AS in the call setup phase. The line I is a control line over which the executive sequencing unit AS is able to output control signals to the data terminal equipment DTE.

At its output side and input side, the executive sequencing unit AS, which executes the respectively-required control events, is connected to a transmission control unit US which controls the execution of transmission commands and coding of basic data. The transmission control unit US is connected with its inputs and outputs via a transmission unit UE to the aforementioned transmission line, i.e. to the two lines Lan and Lab. The transmission unit UE essentially serves as a converting device between the transmission control unit US and the transmission line.

By way of a line Dan for forwarding data signals in the incoming direction and by way of a line Dab for transmitting data signals in the outgoing direction, the transmission control unit US is connected to a bit rate matching device BRA which is further connected at its input and output sides to the transmission line T and to the receiving line R of the data terminal equipment DTE. The task of the bit rate matching device BRA is to undertake a match between the data signal rate utilized in the appertaining subscriber station or, respectively, at the appertaining data terminal equipment DTE and the data signal rate of the transmission line Lan, Lab, regarding which it is to be assumed that it is normally fixedly prescribed and is higher than the data signal rate for which the appertaining data terminal equipment DTE is designed.

Also included in the data circuit terminating equipment DCE illustrated on the drawing is a clock selection circuit TAW which may be connected at its input side to a clock generator TG whose various outputs T1–Tn emit clock signals at different clock rates that can bound to, i.e. synchronized with a transmission clock from the transmission unit UE which serves as a reference clock. At a further output T0, the clock generator TG emits clock pulses that correspond to a defined data signal rate, whereby, in the present case, this may be a matter of, for example, a data signal rate of 2.4 kbit/s with which signaling information can be transmitted to and from respective individual subscriber stations or respective data terminal equipment.

The clock selection circuit TAW, schematically illustrated as a selector switch, is connected at its output to one input terminal of a transfer switch TU comprising two input terminals and one output terminal, the output terminal thereof being connected via a line S to the data terminal equipment DTE to which the selected clock pulses are supplied over the line S. The other input terminal of the transfer switch TU is directly connected to the output T0 of the clock generator TG. An actuation input of the transfer switch TU is connected by way of a control line X to the executive sequencing device AS which switches the transfer switch TU from its normal switch position illustrated on the drawing into its other switch position when the signaling phase has been concluded with the setting of the selected data transmission rate and data signals transmitted by the data terminal equipment DTE are now to be transferred to the bit rate matching device BRA or, respectively, data signals output by the latter are to be forwarded to the data terminal equipment DTE. To this end, the output of the clock selection circuit TAW is connected to a clock input of the bit rate matching device BRA.

The clock selection circuit TAW considered above is a component of a setting device belonging to the data circuit terminating equipment DCE shown on the drawing and also includes a switch SW having an output for supplying setting signals for the bit rate matching device BRA and for the clock selection circuit TAW. At its input side, the transfer switch Sw is connected to the output of a coding switch CS, on the one hand, and to the output of a register Reg, on the other hand. A comparator K is connected to the outputs of the coding switch CS and the register Reg for comparing the signals supplied thereto from the register Reg via a line or line group CL1 with the signals supplied thereto from the coding switch CS via a line or line group CL2, which may be binarily-coded value assignments regarding the data signal rates to be identified thereby. Overall, the signals output by the coding switching CS offer preset parameters regarding the data signal rate with which the subscriber station or data terminal equipment is able to operate. The comparator K compares these parameters to an information signal stored in the register Reg proceeding from the transmission control unit US which had been emitted in the course of setting up a connection or, respectively, after the completion of setting up a connection, having been emitted to the subscriber station shown on the drawing from another subscriber station that may be viewed as the calling subscriber station and which offers particulars in the information signal regarding its own data signal rate. The comparator outputs a specific output signal at its outputs, referenced with < or = when the value of the information signal intermediately stored in the register Reg is equal to or higher than the value of the parameters offered by the coding switch CS. In this case, the transfer switch SW is located in the switch position shown on the drawing given the appearance of this specific output signal. In this switch position, that clock signal rate value designated by the coding switch is selected as the common clock signal rate value when, as assumed, this value has derived from the comparison of the parameters and of the information signal as being equal to or lower than that requested by the remote data circuit terminating equipment DCE. This value is employed by the circuit arrangement under consideration for a corresponding setting of the clock selection circuit TAW via the transfer switch SW. In response to its setting, the clock selection circuit TAW emits a clock signal at its output having a clock signal rate that is given by the aforementioned comparison result of the comparison executed by the comparator K. Stated in other words, this means that a direct assignment occurs between the respectively-selected clock signal rate and the data signal rate.

The value employed for setting the clock selection circuit TAW is also output via a line or line group CL3 to the bit rate matching device BRA which has therefore received all requisite information in order to transmit data signals with the correct data signal rate to or, respectively, from the appertaining data terminal equipment DTE and, moreover, in order to undertake a match between this data signal rate and the data signal rate of the transmission line Lan, Lab which is normally higher in comparison thereto.

It should also be noted that with respect to the register Reg that the register input is connected to the output of the transmission control unit US mentioned above. By way of this transmission control unit US, the register Reg is supplied with only that specific information signal which had been supplied to the appertaining transmission control unit US from the transmission line in the bit stream of the whole signaling information.

The structure of the circuit arrangement illustrated on the drawing having been considered above, the manner of operation of this circuit arrangement shall now be considered in greater detail.

It is first assumed that a connection is to be established from a calling subscriber station having the structure shown on the drawing to a different subscriber station constructed in a corresponding manner. The former subscriber station is referred to as the calling subscriber station and the latter subscriber station is referred to as the subscriber station to be called.

In a signaling phase, the calling subscriber station first outputs a signaling information which, for example, contains the call number of the requested subscriber station to be called. Employed to this end is the clock signal from the output T0 of the clock generator TG, this being considered to be clock signal having a clock signal rate of, for example, 2.4 kbit/s, in order to therefore accept the corresponding signaling information from the data terminal equipment DTE and, forwarded via the executive sequencing unit AS, to introduce the signaling information into, for example, a reserved time slot of the transmission control unit AS which operates in the manner of a multiplexer. In the signaling phase, further, the calling subscriber station outputs an information signal which identifies the nominal data signal rate desired by or just possible for the calling subscriber station. This information signal can either be output by the data terminal equipment DTE or can be automatically derived from the position of the appertaining coding switch CS which correspondingly controls the executive sequencing unit AS via the line or line group CL2 so that the information signal is transmitted to the subscriber station to be called or, respectively, already called.

The following operations sequence in the subscriber station to be called or, respectively, already called. The information signal supplied to the subscriber station to be called or already called is compared in the subscriber station to the preset parameter existing there or, respectively, to the preset parameters existing there which relate to the data signal rate with which the subscriber station is capable of operating. As a result of this comparison, that data signal rate which is the lower data signal rate (i.e. the highest possible common data signal rate) of the data signal rates practically compared with one another is then selected in the subscriber station called or to be called. Events thus sequencing in the subscriber station to be called or already called completely correspond to the events already considered above in the context of the explanation of the circuit structure.

After the setting of the data signal rate has been accomplished in the subscriber station called or to be called, a setting of the data signal rate in the calling subscriber station is then also required under given conditions. To this end, the subscriber station to be called or already called, as just considered, answers back a corresponding information signal or, respectively, a setting signal to the calling subscriber. Insofar as the data signal rates selected or, respectively, set in the subscriber station called or to be called is lower than the nominal data signal rate that had been specified by the calling subscriber as desired or possible, a setting now occurs in the calling subscriber station to the data signal rate that has already been set in the subscriber station called or to be called. The method of setting the data signal rate in the calling subscriber station is the same as that in the subscriber station to be called or, respectively, already called, which method has been already explained above.

After the conclusion of the events set forth above, both the called and calling subscriber stations are set to one and the same data signal rate. This data signal rate is a matter of the respective highest effective common data signal rate possible with which the two subscriber stations can enter into data transmission with one another during the connection which has been established.

By way of transmitting separate control signals, for example in the form of polarity changes, finally, it can be signaled after the conclusion of the setting of the data signal rates that data signal transmission can begin. It thereby suffices for such a signal to be output, for example, from the calling subscriber station to the called subscriber station since a corresponding information signal or, respectively, setting signal regarding the data signal rate has been transmitted from the called subscriber station to the calling subscriber station.

In conclusion, it should also be pointed out that it has been set forth above, with respect to the transmission of the information signal appertaining to the data signal rate, proceeding from a calling subscriber station that the information signal is transmitted to a called subscriber station. This, therefore, covers the case that the appertaining information signal is transmitted from a calling subscriber station to a called subscriber station during the course of a connection set up, as well as the case that the appertaining information signal is transmitted after set up of a connection between a first controlling subscriber station and a second subscriber station being controlled by the first one. The same events that have been described above sequence in both cases in the called subscriber station as well as in the calling subscriber station.

Conventional, or respectively, commercially available devices can be employed for the circuit arrangement illustrated on the drawing. The data terminal DTE is a matter of any data terminal which, e.g. meets one of the CCITT recommendations X.21 or X.21 bis.

The clock generator TG can be a matter of a traditional clock oscillator circuit having frequency dividers.

A well-known phase locked loop (PLL) circuit can be used to bind the generator's clock to the network's clock delivered by the transmission unit UE.

The clock selection circuit TAW, as well as the switches TU and Sw can be formed by traditional, controllable semiconductor switches.

The comparator K and the register Reg can likewise be constructed by way of traditional semiconductor circuits, such as integrated circuits.

The coding switch CS can be a conventional setting switch.

The transmission control unit US and the sequence control unit AS can be formed by the control portion of a commercially-available data circuit terminating equipment such as obtainable, for example, from the Siemens Corporation, Iselin, N.J., under the designation DFG9600 UE-1. The control portion thereby fulfills both the execution of the call set up and the call clear down, as well as the execution of the data signal transmission.

Although I have described my invention by reference to particular embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A subscriber station for connection between a data terminal and an incoming and an outgoing transmission line of a data network and for transmitting and receiving data via the data network, including data transmission rate information, comprising:
   a data circuit terminating equipment by which the data terminal is connected to the incoming and outgoing transmission lines, including storage means for storing data transmission rates for the permissible operating data transmission rates of the subscriber station;
   a comparator in said data circuit terminating equipment operable to compare a data transmission rate information received from another subscriber station with the stored data transmission rates and identify the highest available data transmission rate as the rate requested or as the maximum data transmission rate of the subscriber station as a common data transmission rate;
   a setting means connected to said comparator and operable to produce setting signals for setting the subscriber station to the common data transmission rate; and
   transmission means connected to said setting means for transmitting setting signals to the other subscriber station for setting the same to the common data transmission rate.

2. The subscriber station of claim 1, wherein:
said data circuit terminating equipment comprises a clock generator and a clock selection circuit connected to said clock generator and set by the setting signal to output clock signals corresponding to a selected data transmission rate.

3. The subscriber station of claim 2, wherein:
said clock generator comprises a plurality of outputs carrying clock signals of different clock rates, including one output carrying a clock signal for a signaling phase.

4. The subscriber station of claim 1, wherein:
said setting means comprises a bit rate matching means for matching the set bit rate and a higher bit rate controlling on the incoming and outgoing transmission lines.

* * * * *